US012722841B2

(12) United States Patent
Lindquist

(10) Patent No.: US 12,722,841 B2
(45) Date of Patent: Sep. 1, 2026

(54) FREE-STANDING FRIED FOOD AND CONDIMENT HOLDER

(71) Applicant: Scott M. Lindquist, Huntington, NY (US)

(72) Inventor: Scott M. Lindquist, Huntington, NY (US)

( * ) Notice: Subject to any disclaimer, the term of this patent is extended or adjusted under 35 U.S.C. 154(b) by 130 days.

(21) Appl. No.: 18/922,044

(22) Filed: Oct. 21, 2024

(65) Prior Publication Data

US 2026/0091908 A1 Apr. 2, 2026

Related U.S. Application Data

(63) Continuation-in-part of application No. 29/966,131, filed on Sep. 30, 2024.

(51) Int. Cl.

| | |
|---|---|
| ***B65D 5/32*** | (2006.01) |
| ***A47G 19/30*** | (2006.01) |
| ***B31B 50/26*** | (2017.01) |
| *B31B 105/00* | (2017.01) |
| *B31B 110/30* | (2017.01) |

(52) U.S. Cl.

CPC ............... *B65D 5/32* (2013.01); *A47G 19/30* (2013.01); *B31B 50/26* (2017.08); *B31B 2105/00* (2017.08); *B31B 2110/30* (2017.08)

(58) Field of Classification Search

CPC ....... B65D 5/32; B31B 50/26; B31B 2105/00; B31B 2110/30; A47G 19/30

USPC .................................................... 229/120.01

See application file for complete search history.

(56) References Cited

U.S. PATENT DOCUMENTS

| | | | | | |
|---|---|---|---|---|---|
| 5,842,631 | A | 12/1998 | Berger | | |
| 6,102,208 | A * | 8/2000 | Huang | B65D 81/3205 | 206/541 |
| 6,349,874 | B1 | 2/2002 | Hill | | |
| 6,471,119 | B2 * | 10/2002 | Cai | B65D 5/48002 | 229/116 |
| 6,705,514 | B2 * | 3/2004 | Pellati | B65D 5/008 | 229/120.12 |
| 6,719,192 | B2 * | 4/2004 | Barcat | A47G 19/04 | 229/906 |
| 7,140,532 | B2 * | 11/2006 | Holt | B65D 81/3205 | 229/405 |
| 7,520,417 | B2 * | 4/2009 | Biedermann | B65D 25/20 | 206/815 |
| 8,584,884 | B2 * | 11/2013 | Learn | B65D 5/5286 | 229/404 |
| 8,646,681 | B2 * | 2/2014 | Lindquist | B65D 31/12 | 229/120.01 |

(Continued)

FOREIGN PATENT DOCUMENTS

| | | | |
|---|---|---|---|
| WO | 2006014844 | A2 | 2/2006 |
| WO | 2017055474 | A1 | 4/2017 |

*Primary Examiner* — Peter N Helvey

(57) ABSTRACT

A container for holding a number of items in a primary compartment and a number of items in a secondary attached compartment. The secondary compartment extends from the primary compartment so that the items are held in conjunction. The primary compartment includes a stabilizing feature protruding from its base to provide additional stability when the container is free-standing. The container is designed to accommodate snack foods, such as fried potatoes or mozzarella sticks, along with the condiments commonly associated with such snack foods.

5 Claims, 10 Drawing Sheets

(56) References Cited

U.S. PATENT DOCUMENTS

| | | | | |
|---|---|---|---|---|
| D790,989 | S * | 7/2017 | Butler | D9/761 |
| D801,831 | S * | 11/2017 | Gallimore | D9/761 |
| 9,809,373 | B2 * | 11/2017 | Gallimore | B65D 5/029 |
| D982,388 | S * | 4/2023 | Fellner | D7/602 |
| D1,093,161 | S * | 9/2025 | Hart | D9/702 |
| D1,116,852 | S * | 3/2026 | Theard, Jr. | D9/761 |
| 2008/0093433 | A1 * | 4/2008 | Haroutiounian | B65D 81/3205 229/405 |
| 2016/0007806 | A1 * | 1/2016 | Rosen | A47J 47/14 206/541 |
| 2022/0033134 | A1 * | 2/2022 | Pinkstone | B65D 5/4204 |
| 2023/0294896 | A1 * | 9/2023 | Jackson | B65D 77/042 206/514 |
| 2025/0121978 | A1 * | 4/2025 | Nowak | B31B 50/26 |

* cited by examiner

FREE-STANDING FRIED FOOD AND CONDIMENT HOLDER

FIELD OF THE INVENTION

The present invention relates generally to an apparatus for holding fried snacks. More particularly, the present invention provides for a vertically freestanding container for holding French fries or similar objects alongside a separate compartment for holding a selection of condiments and similar materials.

BACKGROUND OF THE INVENTION

Containers for restaurant side items such as French Fries, Chicken Fingers, Pretzel Bites, or Churros (and similar treats) are often analogous to simple cardboard cups that have been designed for compact storage and the ability to be efficiently loaded from the top and placed into a carry-out bag or on a tray. Though some have the ability to stand upright, this is typically achieved in a manner that does not provide stability to the container while it is standing. Thus, most such containers are turned horizontal or leaned against sturdier objects. The expectation of lying or leaning the container along with its lack of upright stability limits customers' use in situations or environments where they would ideally prefer to have a fully upright container. This is a particular annoyance when the food needs to be held in a certain orientation for certain elements of enjoyment, like when adding salt/spices or for frozen treats.

The present invention provides a stabilizing element which allows for the container to better stand compared to similar foldout containers. Further, a condiment holder has been incorporated onto the device, which would otherwise have reduced efficacy when implemented on a container with a less stable foundation. This allows a customer to cleanly enjoy their preferred sauces without relying on napkins, food wrappers, or other similar options that can be unnecessarily messy. The present invention allows for an improved customer experience while also offering the utility of being foldable and stackable for shipping and storage. The addition of stabilizing elements to the containers provides a novel approach to customer quality of service. Notably, this approach is useful for a variety of snack foods which often utilize similarly fashioned containers to French fries, such as mozzarella sticks or chicken fingers.

DETAIL DESCRIPTIONS OF THE INVENTION

All illustrations of the drawings are for the purpose of describing selected versions of the present invention and are not intended to limit the scope of the present invention. For example, use with snack foods with similar shapes to French fries such as mozzarella sticks, chicken fingers, pretzel sticks/bites, or churros is within the scope of invention, scaling up or down in size to accommodate the relevant snack.

Figure 1:
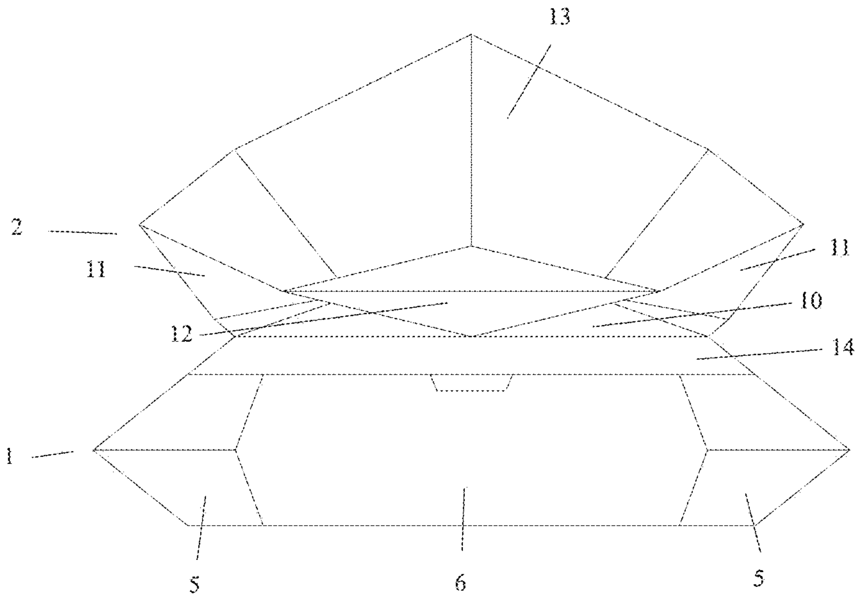
FIG. 1 is an overhead view for an embodiment of the present invention, in a deployed configuration.
Figure 2:
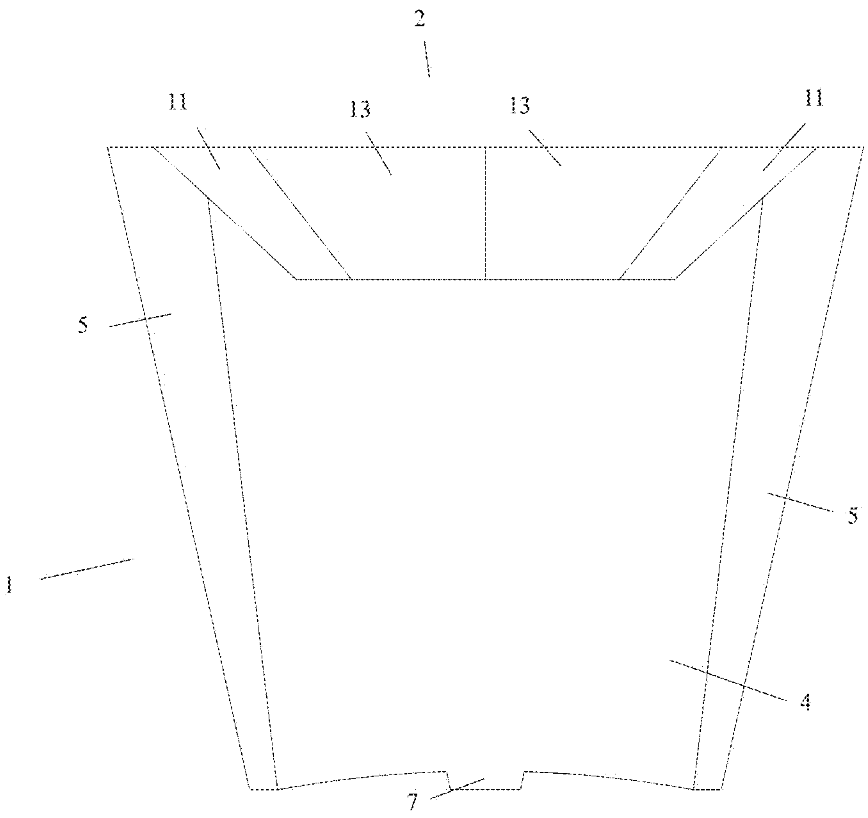
FIG. 2 is a rear facing view for an embodiment of the present invention, in a deployed configuration.
Figure 3:
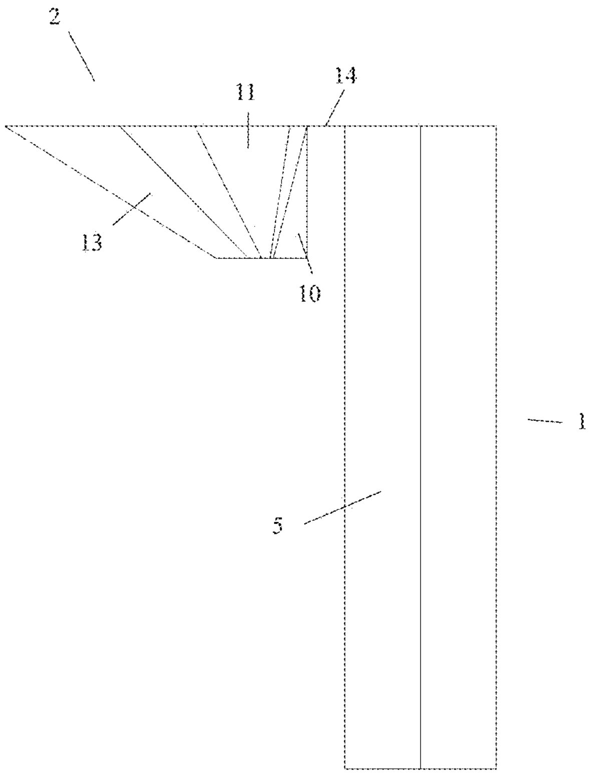
FIG. 3 is a left-side view for an embodiment of the present invention, in a deployed configuration.
Figure 4:
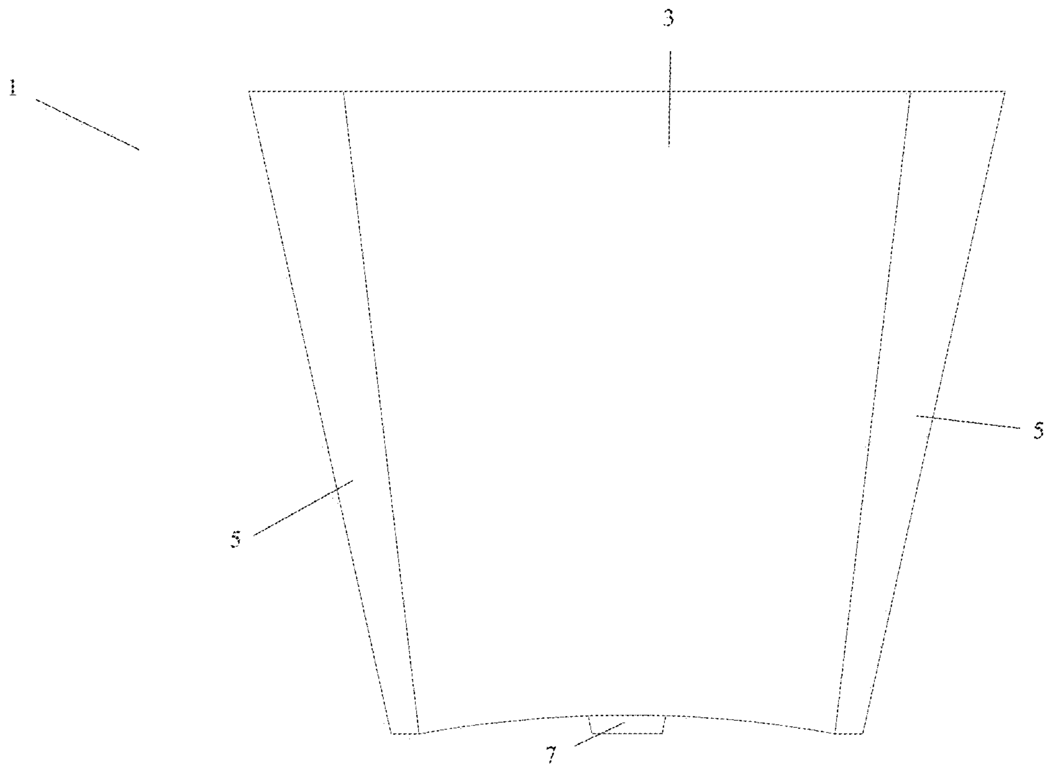
FIG. 4 is a front facing view for an embodiment of the present invention, in a deployed configuration.
Figure 5:
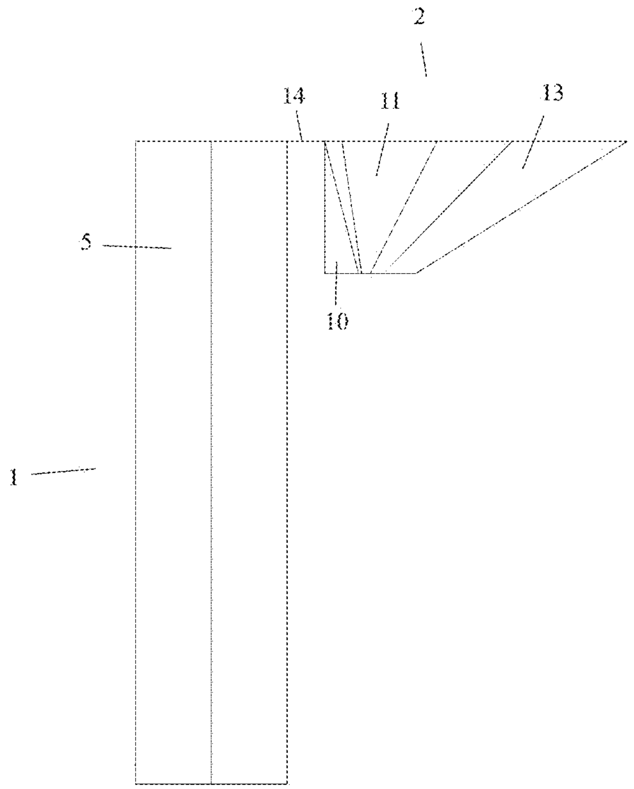
FIG. 5 is a right-side view for an embodiment of the present invention, in a deployed configuration.
Figure 6:
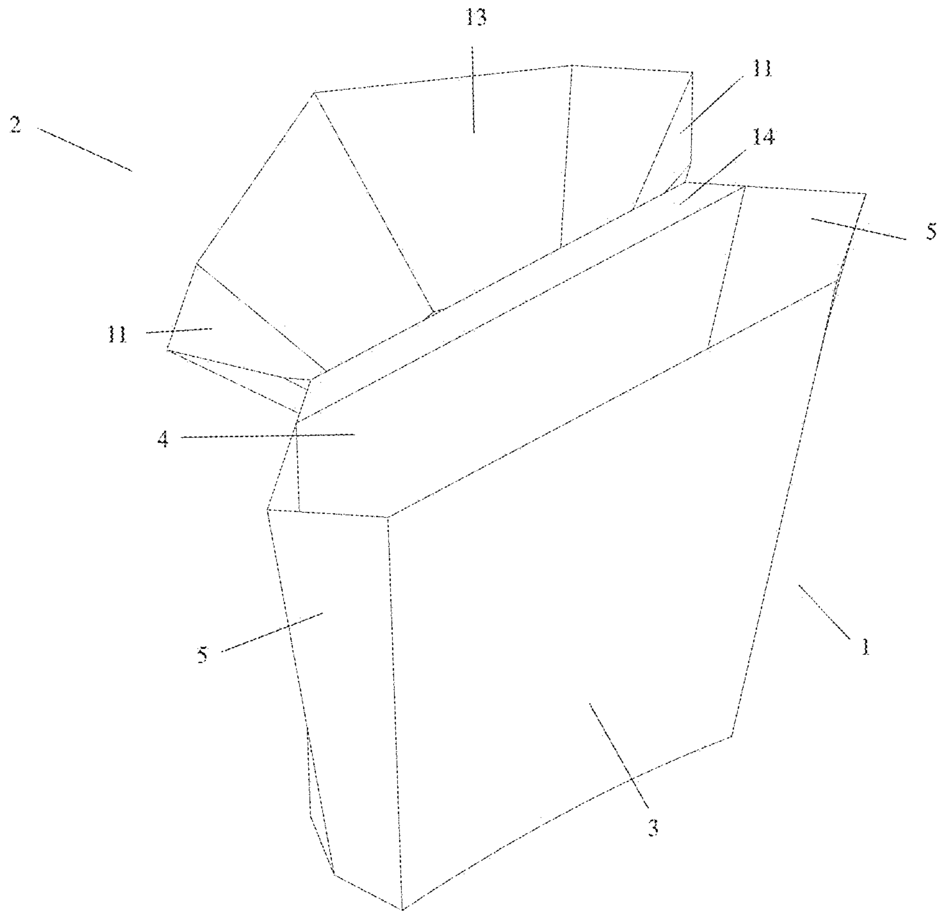
FIG. 6 is a top left off-set view for an embodiment of the present invention, in a deployed configuration.
Figure 7:
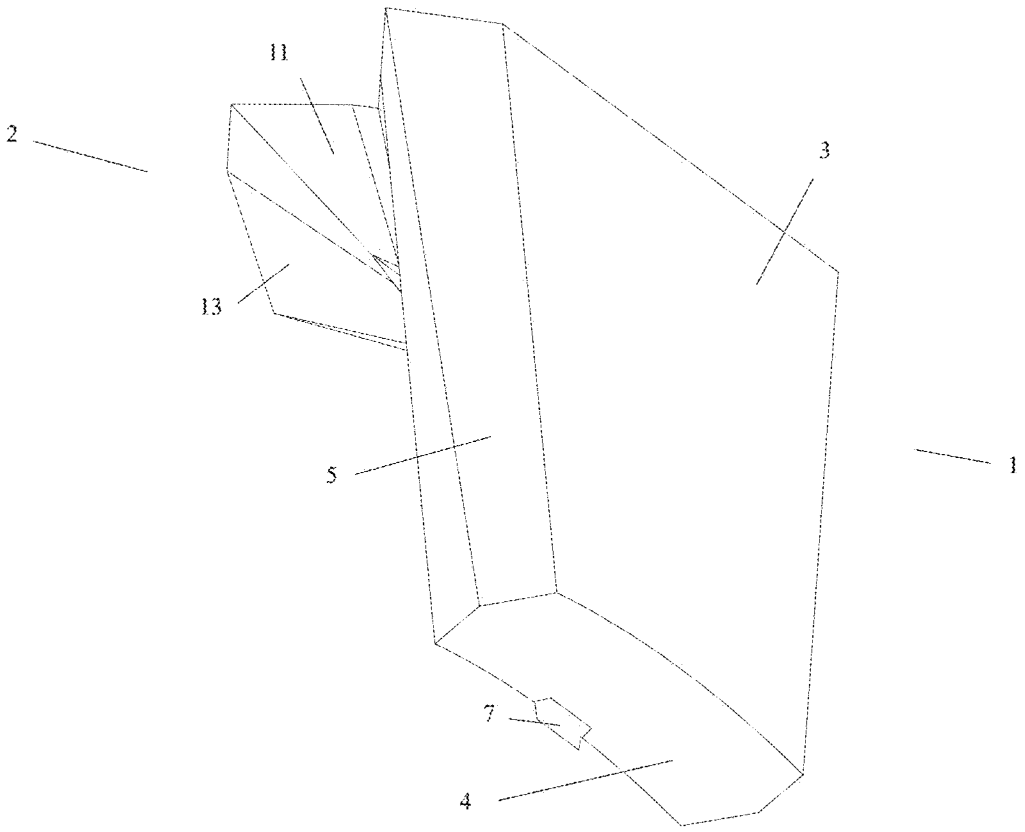
FIG. 7 is a bottom left off-set view for an embodiment of the present invention, in a deployed configuration.
Figure 8:
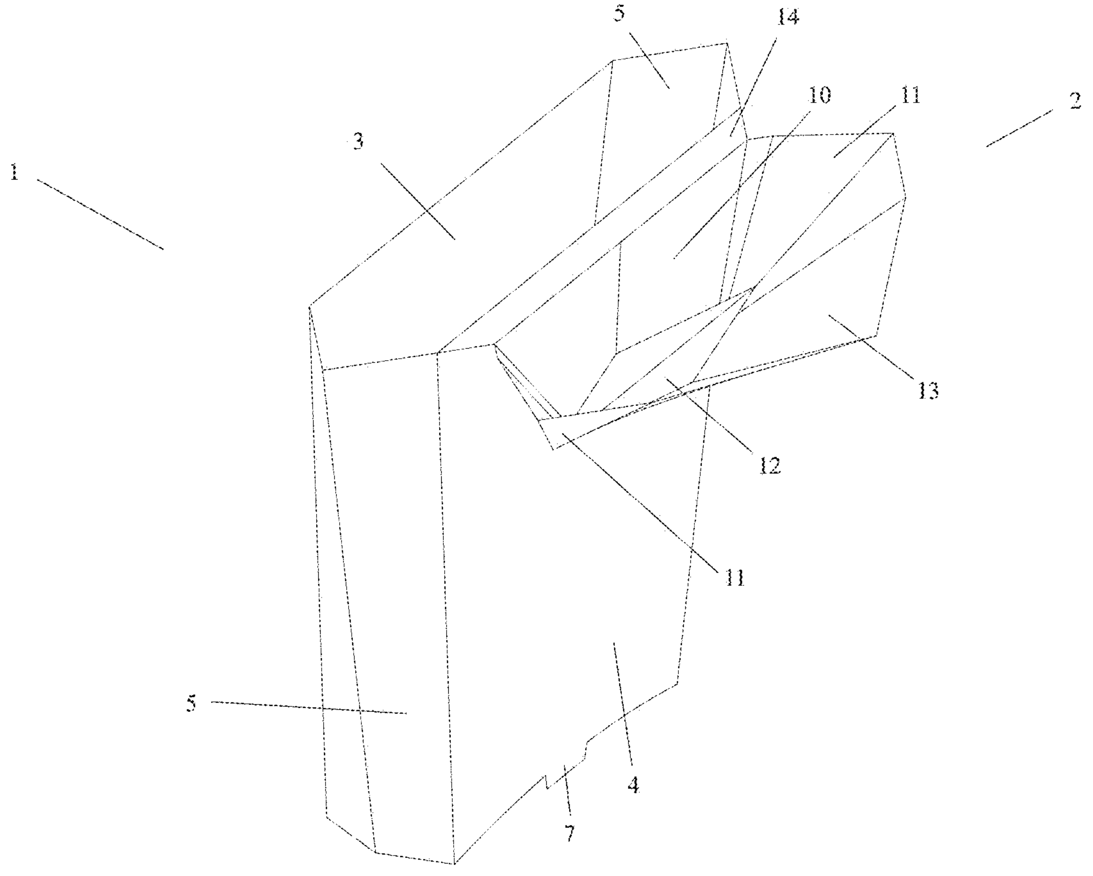
FIG. 8 is a top right rear off-set view for an embodiment of the present invention, in a deployed configuration.
Figure 9:
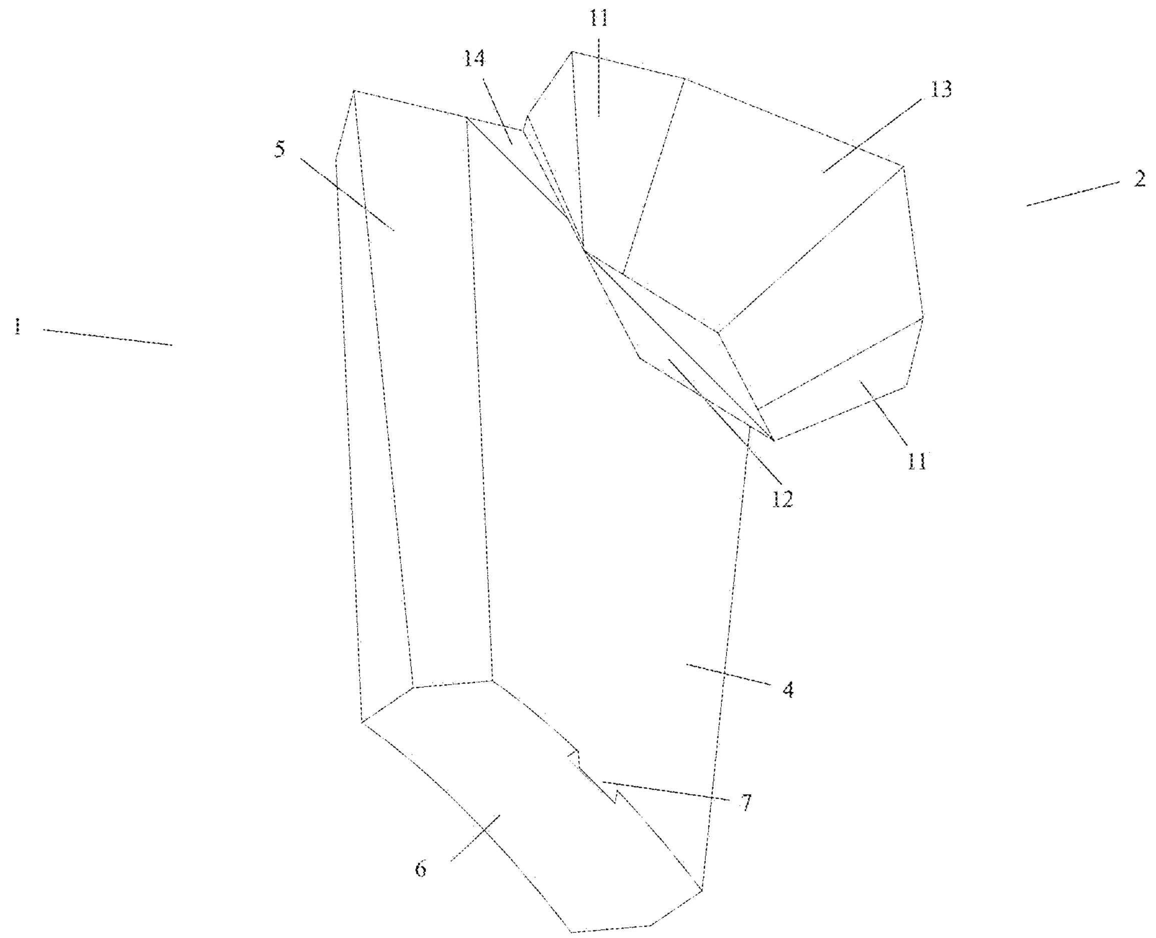
FIG. 9 is a bottom right rear off-set view for an embodiment of the present invention, in a deployed configuration.
Figure 10:
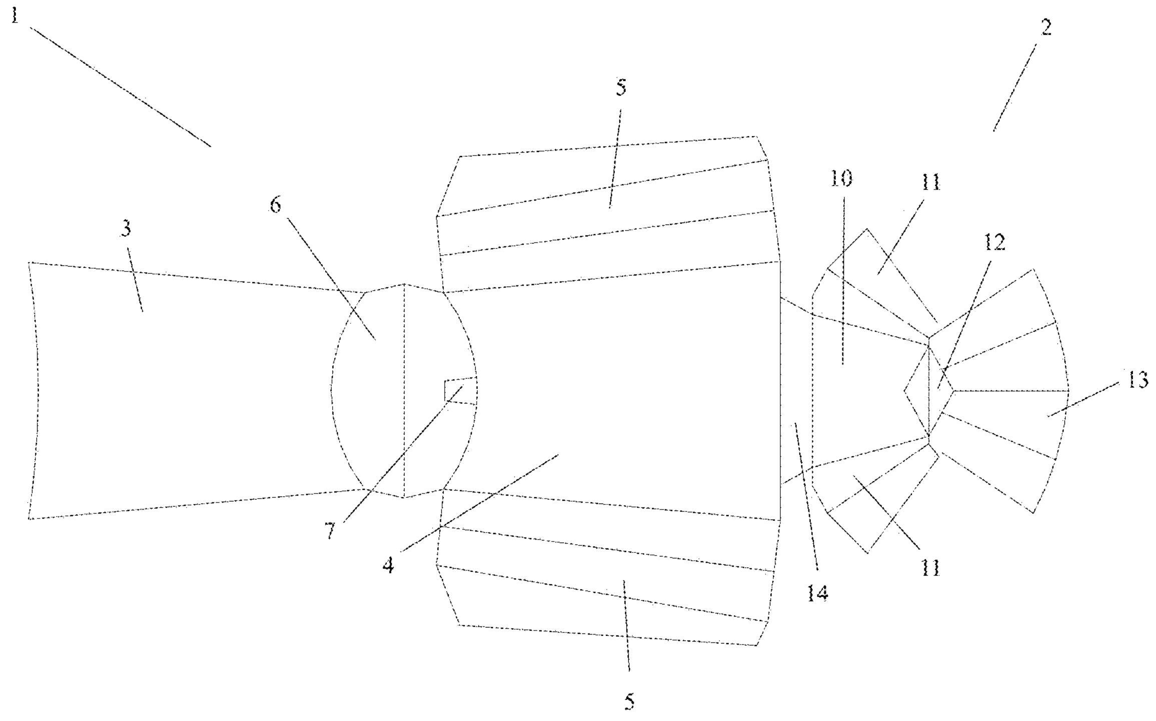
FIG. 10 is an overview for an embodiment of the present invention, in a pre-deployment, unfolded configuration.

The present invention is a snack food holder, as shown in FIGS. 1-10. Though designed for use with French fries and dips, it is within the scope of the invention to be used for other snack foods that fit within the container. The container comprises of a larger primary compartment (1) and a secondary compartment (2). The primary compartment holds the subject food, such as French fries, in the open manner of French fry containers at common fast-food restaurants. The smaller secondary compartment holds condiments such as ketchup or other sauces, which could be described in the manner of a cup holder or pocket. The primary and secondary compartments are attached, such that the secondary compartment can be described as being situated at the top-rear of the primary compartment. Embodiments may have both compartments constructed from the same foldout material, as demonstrated by FIG. 10. Other embodiments may further comprise an amount of adhesive to attach the compartments in a similar location. The secondary compartment may be folded flush with the back of the primary compartment when a customer elects to forego that functionality.

The primary compartment is composed of several foldout and cutout sections which serve to form the main body of the snack holder when folded. Specifically, the primary compartment comprises a front panel (3), back panel (4), two side foldouts (5), a base foldout (6), and one or more stabilizing tabs (7). Constructing the compartment can be achieved from a single piece of material, such as card board. For construction of this embodiment, the base foldout (6) is folded to be roughly orthogonal with both the front panel (3) and back panel (4). The base foldout (6) is curved or angled such that, when folded, the one or more stabilizing tabs (7) protrude from the bottom of the compartment. The one or more stabilizing tabs (7) are structurally a part of the back panel (4) and become exposed when the base foldout (6) is not flush with the back panel (4). The side foldouts (5) are then folded toward and attached to the front panel (3) along an attachment fold (8) portion of the foldout. In the preferred embodiment, some amount of adhesive may be used to attach the front panel (3) and side foldouts (6). Other embodiments may utilize non-adhesive means such as hook tabs, latches, or slots to achieve sufficient attachment, though other mechanical options are within the scope of this invention. Embodiments which also attach the side foldouts to the base foldout when deployed are also within the scope of this invention.

The secondary compartment is similarly composed of several foldout and cutout sections which fold to form a secondary body for holding condiments and similarly ancillary additions. Specifically, the secondary compartment comprises a small panel (10), two side foldouts (11), a base foldout (12), a fan foldout (13), and a connecting panel (14). For the preferred embodiment, the connecting panel (14) is attached to the back panel (4) of the main compartment such that the whole invention is formed from a single sheet of material. Other embodiments may attach the primary and secondary compartments along the connecting panel using an amount of adhesive or other means. When constructing the secondary compartment for the preferred embodiment, the base foldout (12) is folded in the rotationally opposite direction of the front panel (3) to a position roughly orthogonal with the small panel (10) and fan foldout (13). Each side foldout (11) is then folded toward the fan foldout (13) and attached along their adjacent nearest sides. The preferred embodiment utilizes an amount of adhesive to secure the attachment. Other embodiments may take advantage of mechanical means to attach the sides such as hook tabs, latches, or slots to complete the construction. A notable alternate embodiment would additionally incorporate one or more stabilizing tabs protruding from the bottom of the front panel using the same structural cut-out method as the rear panel.

Once constructed, either or both of the compartments may be re folded in a manner that flattens the container for storage and later redeployment or disposal without detaching the attached portions.

An alternative embodiment would incorporate a second set of one or more stabilizing tabs protruding from bottom of the compartment. The additional stabilizing tabs would instead be structurally a part of the front panel and, similarly, become exposed when the base foldout is not flush with the front panel. The alternate embodiment would, otherwise, be constructed and deployed in the same manner as the preferred embodiment while providing additional stability.

Although the invention has been explained in relation to its preferred embodiment, it is to be understood that many other possible modifications and variations can be made without departing from the spirit and scope of the invention.

The invention claimed is:

1. A food container comprising:

a primary compartment comprising
- a front panel,
- a rear panel,
- a left side foldout,
- a right side foldout, and
- a base foldout;
- wherein
  - the primary compartment components are comprised of a single sheet of material,
  - the rear panel is formed connected to the left side foldout and right side foldout on its corresponding sides,
  - the rear panel is formed connected to the base foldout at the panel's bottom side,
  - the front panel is formed connected to the base foldout at the panel's bottom side opposite the rear panel, and
  - one or more non-folding tabs are cut in the adjoining region between the rear panel and base foldout such that when the base foldout is folded away from the rear panel, the non-folding tabs protrude from the bottom of the compartment;

a secondary compartment comprising
- a small panel,
- a left side foldout,
- a right side foldout,
- a base foldout,
- a fan foldout, and
- a connecting panel;
- wherein
  - the secondary compartment components are comprised of a single sheet of material,
  - the small panel is formed connected to the left side foldout and right side foldout on its corresponding sides,
  - the small panel is formed connected to the base foldout at the panel's bottom side,
  - the small panel is formed connected to the connecting panel at the small panel's top side, and
  - the fan foldout is formed connected to the base foldout at the fan foldout's bottom side opposite the small panel;

wherein
- the primary compartment is constructed by folding the base foldout to a position roughly orthogonal from the rear panel, the front panel is folded away from the base foldout to be roughly parallel with the rear panel, the left and right side foldouts are each folded toward and attached to the front panel to form a cavity;
- the secondary compartment is constructed by folding the base foldout to a position roughly orthogonal from the small panel, the fan foldout is folded away from the base foldout to be roughly parallel with the rear panel, the left and right side foldouts are each folded toward and attached to the fan foldout to form a cavity;
- and
- the secondary compartment is attached to the primary compartment by connecting the connecting panel to the rear panel and folding the secondary compartment away from the primary compartment's cavity.

2. The container of claim 1, wherein the primary compartment and secondary compartment are each comprised from the same sheet of material and the connecting panel is further formed connected to the top of the back panel.

3. The container of claim 1, wherein the container further comprises an amount of adhesive wherein the left and right side foldouts of the primary compartment are attached to the front panel by an amount of adhesive when constructing the primary compartment.

4. The container of claim 1, wherein the container further comprises an amount of adhesive wherein the left and right side foldouts of the secondary compartment are attached to the fan foldout by an amount of adhesive when constructing the primary compartment.

5. A food container comprising:

a primary compartment comprising
- a front panel,
- a rear panel,
- a left side foldout,
- a right side foldout, and
- a base foldout;
- wherein
  - the primary compartment components are comprised of a single sheet of material,
  - the rear panel is formed connected to the left side foldout and right side foldout on its corresponding sides,
  - the rear panel is formed connected to the base foldout at the panel's bottom side,
  - the front panel is formed connected to the base foldout at the panel's bottom side opposite the rear panel,
  - one or more non-folding tabs are cut in the adjoining region between the rear panel and base foldout such that when the base foldout is folded away from the rear panel, the non-folding tabs protrude from the bottom of the compartment, and one or more non-folding tabs are cut in the adjoining region between the front panel and base foldout such that when the base foldout is folded away from the front panel, the non-folding tabs protrude from the bottom of the compartment;

a secondary compartment comprising a small panel, a left side foldout, a right side foldout, a base foldout, a fan foldout, and a connecting panel;

wherein the secondary compartment components are comprised of a single sheet of material, the small panel is formed connected to the left side foldout and right side foldout on its corresponding sides, the small panel is formed connected to the base foldout at the panel's bottom side, the small panel is formed connected to the connecting panel at the small panel's top side, and the fan foldout is formed connected to the base foldout at the fan foldout's bottom side opposite the small panel;

wherein the primary compartment is constructed by folding the base foldout to a position roughly orthogonal from the rear panel, the front panel is folded away from the base foldout to be roughly parallel with the rear panel, the left and right side foldouts are each folded toward and attached to the front panel to form a cavity;

the secondary compartment is constructed by folding the base foldout to a position roughly orthogonal from the small panel, the fan foldout is folded away from the base foldout to be roughly parallel with the rear panel, the left and right side foldouts are each folded toward and attached to the fan foldout to form a cavity;

and the secondary compartment is attached to the primary compartment by connecting the connecting panel to the rear panel and folding the secondary compartment away from the primary compartment's cavity.

* * * * *